United States Patent
Vellaiyanaicken et al.

(10) Patent No.: US 9,322,638 B2
(45) Date of Patent: Apr. 26, 2016

(54) MAGNETIC FLUX ENHANCER SYSTEM BETWEEN MAGNETIC FIELD GENERATING MEANS AND ROTOR FOR RELUCTANCE TYPE SENSORS

(71) Applicant: TE Connectivity India Private Limited, Karnataka, Bangalore (IN)

(72) Inventors: Palanisamy Vellaiyanaicken, Chennai (IN); Devikishor Konadka, Karnataka (IN)

(73) Assignee: TE Connectivity India Private Limited, Karnataka, Bangalore (IN)

( * ) Notice: Subject to any disclaimer, the term of this patent is extended or adjusted under 35 U.S.C. 154(b) by 76 days.

(21) Appl. No.: 14/353,755

(22) PCT Filed: Oct. 16, 2012

(86) PCT No.: PCT/EP2012/070495
§ 371 (c)(1),
(2) Date: Apr. 23, 2014

(87) PCT Pub. No.: WO2013/060601
PCT Pub. Date: May 2, 2013

(65) Prior Publication Data
US 2014/0312885 A1    Oct. 23, 2014

(30) Foreign Application Priority Data
Oct. 24, 2011   (IN) .......................... 3648/CHE/2011

(51) Int. Cl.
*G01B 7/30* (2006.01)
*G01D 5/12* (2006.01)
*G01P 3/44* (2006.01)
*G01D 5/20* (2006.01)

(52) U.S. Cl.
CPC .. *G01B 7/30* (2013.01); *G01D 5/12* (2013.01); *G01D 5/2046* (2013.01); *G01P 3/44* (2013.01)

(58) Field of Classification Search
CPC ......... G01B 7/30; G01D 5/12; G01D 5/2046; G01P 3/44
USPC ........................... 324/207.15–207.17, 207.25
See application file for complete search history.

(56) References Cited

U.S. PATENT DOCUMENTS

| 4,638,197 A | 1/1987 | Kalagidis |
| 5,418,416 A * | 5/1995 | Muller .................. H02K 1/146 310/186 |

(Continued)

FOREIGN PATENT DOCUMENTS

| DE | 4440295 A1 | 5/1996 |
| WO | WO 2010/130550 A1 | 11/2010 |

OTHER PUBLICATIONS

International Search Report and Written Opinion issued by the European Patent Office, dated Jan. 8, 2013, for related International Application No. PCT/EP2012/070495; 12 pages.

*Primary Examiner* — Jay Patidar
(74) *Attorney, Agent, or Firm* — Faegre Baker Daniels LLP

(57) ABSTRACT

A magnetic flux enhancer system for a reluctance type resolver and an electromagnetic angle sensor having the same are provided. The electromagnetic angle sensor has a stator (210) and a rotor (115) that is rotatably supported by a rotation axis on the stator and separated therefrom by a gap, the stator having at least one magnetic field generating means (220) adapted to generate a distribution of magnetic flux that extends over the gap to the rotor, and at least one magnetic field detecting means (220) adapted to detect a change in the magnetic flux distribution caused by a rotation of the rotor. The electromagnetic angle sensor comprises a magnetic flux enhancer (230) adapted to be positioned on a side of the at least one magnetic field generating means that faces the rotor and to concentrate the generated distribution of magnetic flux over the gap along a radial direction substantially perpendicular to the rotation axis.

22 Claims, 8 Drawing Sheets

(56) References Cited

U.S. PATENT DOCUMENTS

| | | | |
|---|---|---|---|
| 2004/0245878 A1* | 12/2004 | Kim | D06F 37/304 310/114 |
| 2010/0117632 A1 | 5/2010 | Miyazaki et al. | |
| 2010/0164307 A1* | 7/2010 | Kim | D06F 37/304 310/43 |
| 2014/0227118 A1* | 8/2014 | Kim | F04D 13/064 417/420 |

* cited by examiner

MAGNETIC FLUX ENHANCER SYSTEM BETWEEN MAGNETIC FIELD GENERATING MEANS AND ROTOR FOR RELUCTANCE TYPE SENSORS

TECHNICAL FIELD OF THE INVENTION

The present invention relates to reluctance-type angle sensors which detect angular velocity and/or angular position of a rotor portion based on the detection of changes of magnetic reluctance or electromotive force caused by the rotor rotation with respect to a stator coil, and more specifically, to a magnetic flux enhancer system, and an electromagnetic angle sensor having same, that enhances the magnetic flux between the stator and rotor by reducing the loss of divergent magnetic flux due to the residual and interim pole gaps present between them.

BACKGROUND OF THE INVENTION

Reluctance-type angle sensors, such as resolvers and synchros, used for determining angular position and/or angular speed of a rotor or rotating shaft are well known in the art. These types of sensors may adopt different forms and designs depending on the application.

A commonly used type includes a stator and a rotor that is rotatable about a concentric axis with respect to the stator and separated from it by an air gap. The stator includes exciting coils or magnetic poles for generating a magnetic flux distribution that extends over the air gap to the rotor, and whose intensity in the air gap is changed when the rotor rotates with respect to the excited stator. The changes in the magnetic flux induce a measurable phase controlled electromagnetic force, which can be detected, for instance, by sensing windings or coils. The angular position of the rotor (with rotating shaft) with respect to the stator may be obtained by analyzing the phase of the detected signals.

Under this type of angle sensors are included the so-called passive reluctance resolvers in which both the exciting and sensing coils are wound on the stator according to a pre-determined winding scheme. The change of magnetic flux is achieved by using a rotor of a soft magnetic material with a non-regular external shape, for instance, provided with lobes or indentations on the surface facing the stator. When the rotor rotates, a variation of the air gap and consequently a change of magnetic reluctance between the rotor and the opposed stator is produced. The particular winding scheme allows the exciting and sensing coils to be influenced differently and therefore, to derive the angular position of the rotor from the electromotive voltage induced by this change.

FIG. 1 shows an exploded view of a conventional synchro-resolver.

The synchro-resolver 100 includes a flange 110 adapted to be mounted onto a mounting structure, such as a frame (not shown). A rotor 115, formed by an assembly of a rotor body 120 and a shaft 125 to which the rotor body 125 is rigidly attached to, is held in position with a spacer ring 130, a circlip 135, a bearing 140 and an E clip 150, which are provided at one side of the rotor shaft 125, and a second bearing 140 that is provided on the opposite side. The rotor shaft 125 is to be engaged with a prime mover (not shown). During operation, the rotor shaft 125, also called follower, spins about its rotation axis Z along with the prime mover. An inner cover 160 seals the rotor 115 and provides a protective covering against any spillage/penetration of any invasive fluids even with higher pressures, thereby serving as a sealing means.

The synchro-resolver 100 further includes a stator 170, which is conventionally formed by a stacked-up lamination containing a number "N" of poles 175 (in the illustrated example, N=12) depending upon the magnetic force needed to be generated on the rotor.

An outer cover 180 provides hermetical sealing against the impact of all external environmental factors that might affect the performance of the reluctance type resolver 100.

The stator poles 175 are provided at regular spaces along the inner perimeter of the stator, and projecting radially inwards towards the rotor axis Z. Exciting coils or windings for generating the magnetic field and sensing coils for detecting the electromagnetic force induced by the rotation of the rotor are wound on the poles 175 (not shown). The winding on each pole is suitably done according to a pre-determined winding scheme.

The number and winding scheme depends on the specific application, such as desired resolution of the synchro-resolver, range of angular speed to be detected, etc., and is done in such a way that the output electromotive force is resolved into the respective sine and cosine waves corresponding to the angular position of the rotor shaft. Examples of specific winding schemes for detecting the angular position of the rotor are fully described in document WO 2010/130550 and references cited therein, and therefore, shall not be described in full detail here.

Document WO 2010/043586 A2 describes another example of a passive reluctance resolver in which the variation of magnetic flux is produced by the distribution of the magnetic mass in a regularly shaped rotor. The so-called half-magnetic rotor has a body with a half made of a soft magnetic material, the magnetic half, and another half made of a non-magnetic material, the balancing half. The magnetic and balancing halves are designed such as to be joined together at a plane that is inclined with relation to the rotational axis of the rotor. The distribution of magnetic mass is such that a sinusoidal change of magnetic flux can be produced when the rotor is rotated.

For both rotor variants, the excited stator generates a magnetic field that extends to the rotor over the air gap and which is distributed over the rotor. Thus, the magnetic force acting on the rotor is one of the decisive factors for the accuracy of the angular measurement of reluctance-type angle sensors.

However, when the stator generates an excitation of magnetic field with which the rotor interacts, there is an appreciable amount of magnetic flux that is not utilized due to the residual gaps and interim pole gaps present between them. In particular, an amount of the produced magnetic flux is lost as divergent fields around the rotor ends, pole gaps, etc, which result in a loss of effective magnetic force acting on the rotor due to the divergence of magnetic flux lines. Further, there might be a formation of eddy currents around each pole of the stator due to self-induction.

The magnitude of the produced magnetic flux that actuates on the rotor is then limited as there is no system to compensate for the loss of magnetic flux due to divergent fields on the rotor surface and spillage across the corners and the pole gaps.

Although a higher current in the stator coil may be used for producing a higher intensity of magnetic flux, this has the disadvantage that more energy is consumed for generating the required output. Further, the improvement reached through an increase of ampere-turns in the stator coil could be only marginal if no other mechanism is used for counterbalancing the lost of divergent magnetic flux.

These factors lead to a loss of the effective magnetic force acting on the rotor. Hence, there is a need for a technique capable of reducing the loss of effective magnetic force acting on the rotor due to the formation of divergent magnetic fields, eddy currents, etc, around each pole of the stator and the rotor surface.

This has poised to think of a technique for effectively using the generated magnetic flux so as to minimize the energy required for excitation of the stator as well as to increase the resolution of the magnetic field vectors resulting from the interaction of the rotor field with that of the stator.

SUMMARY OF THE INVENTION

The present invention aims at overcoming the disadvantages and shortcomings of the prior art techniques and an object thereof is to provide a magnetic flux enhancer system for electromagnetic angle sensors, and an electromagnetic angle sensor using same, in which the loss of magnetic force generated by the stator due to the formation of divergent magnetic fields, currents, etc., around each pole of the stator and rotor surface is effectively reduced.

This object is solved by the subject matter of the independent claims. Advantageous embodiments of the present invention are defined by the dependent claims.

According to the invention it is provided an electromagnetic angle sensor having a stator and a rotor, the rotor being rotatably supported by a rotation axis on the stator and separated therefrom by a gap, the stator having at least one magnetic field generating magnetic field generating means adapted to generate a distribution of magnetic flux that extends over the gap, and at least one magnetic field detecting magnetic means adapted to detect a change in the magnetic flux distribution caused by a rotation of the rotor, the electromagnetic angle sensor comprising a magnetic flux enhancer adapted to be positioned on a side of the at least one magnetic field generating means that faces the rotor and to concentrate the generated distribution of magnetic flux over the gap along a radial direction substantially perpendicular to the rotation axis.

The present invention also provides a magnetic flux enhancer system for reluctance type sensors having a stator and a rotor that is rotatably supported by a rotation axis on the stator and separated therefrom by a gap, the stator generating a distribution of magnetic flux that extends over the gap and detecting a change in the generated magnetic flux caused by a rotation of the rotor, the magnetic flux enhancer system comprising a magnetic flux enhancer adapted to be positioned on a side of a magnetic field generating means of the stator that faces the rotor and to concentrate the distribution of generated magnetic flux over the gap along a radial direction substantially perpendicular to the rotation axis.

By using a magnetic flux enhancer of a magnetic material on the magnetic poles of the stator, the present invention allows to collate the magnetic flux lines around each pole. The summation of magnetic flux on each pole results in a better homogenization of the generated magnetic fields and a concentrated flux around the rotor area which enhances the effective magnetic force acting on the rotor.

The accompanying drawings are incorporated into and form a part of the specification for the purpose of explaining the principles of the invention. The drawings are not to be construed as limiting the invention to only the illustrated and described examples of how the invention can be made and used.

BRIEF DESCRIPTION OF THE FIGURES

Further features and advantages will become apparent from the following and more particular description of the invention as illustrated in the accompanying drawings, in which.

DETAILED DESCRIPTION OF THE INVENTION

Advantageous embodiments of a magnetic flux enhancer system constituted according to the invention and an electromagnetic angle sensor having same will now be described in further detail with reference to the accompanying drawings.

Figure 2:
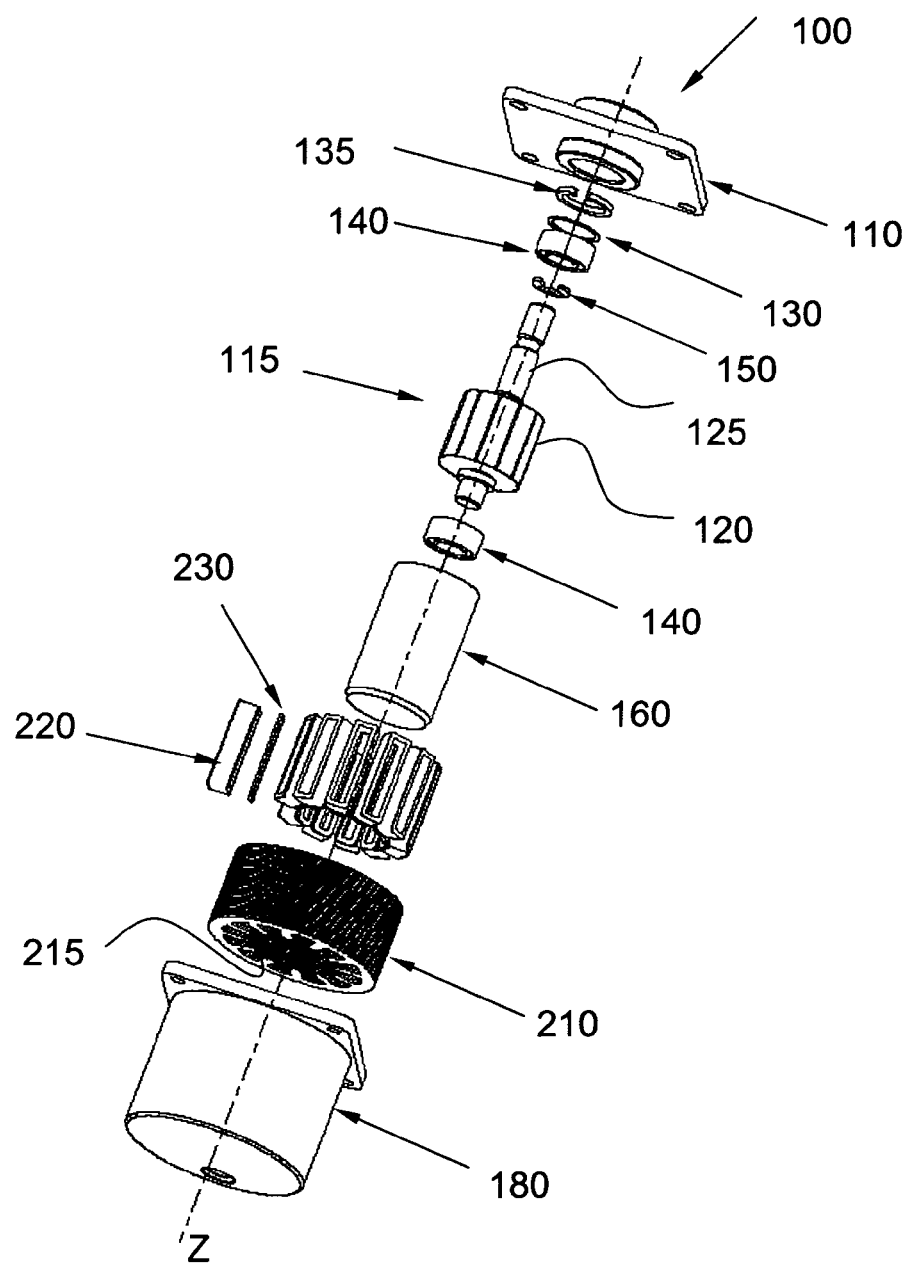
FIG. 2 shows an exploded view of an electromagnetic angle sensor having the magnetic flux enhance system according to the present invention.

FIG. 2 shows an exploded view of a electromagnetic angle sensor according to the present invention.

Figure 1:
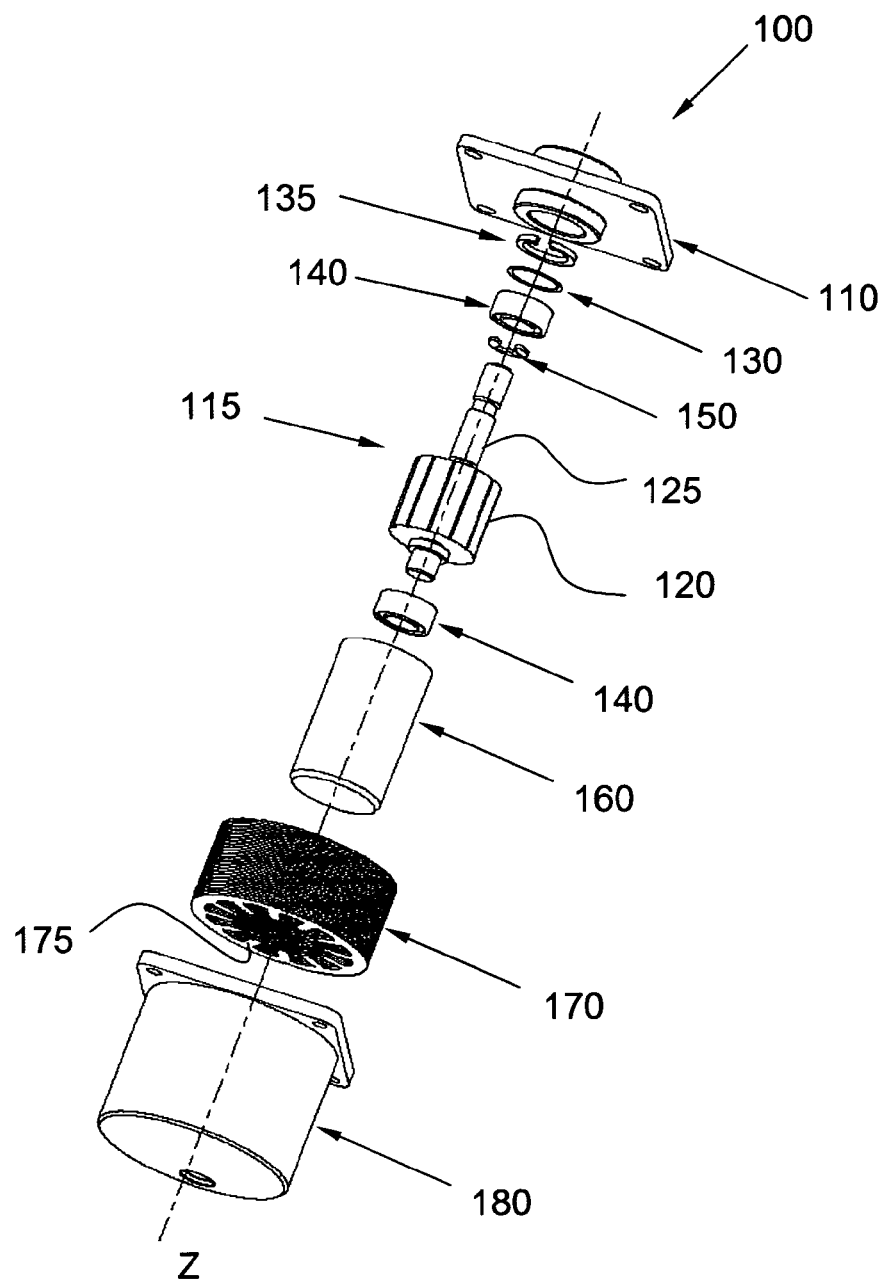
FIG. 1 shows an exploded view of a conventional synchro-resolver device.

Similarly to the prior art synchro-resolver 100 described with reference to FIG. 1, the electromagnetic angle sensor 200 has a flange 110 to mount on to a frame (not shown). The rotor body 120 is a serrated hub that is mounted on the rotor shaft 125, which is to be connected to the prime mover (not shown). The rotor body 120 and shaft 125 are held in position with a spacer ring 130, a circlip 135, two bearings 140 and an E clip 150. The inner cover 160 seals the rotor and provides a protective covering against any spillage of any invasive fluids (such as SKYDROL®) even with high pressures of up to 110 bars.

The stator is formed by a stacked-up lamination 210 containing a plurality (or at least one) of protrusions or poles 215 (in the illustrated embodiment, 12 poles).

According to the invention, each pole 215 of the stacked-up lamination part is mounted with a bobbin 220, which carries the winding, and a magnetic clip 230 which serves as a magnetic flux enhancer.

However, a configuration may be envisaged in which the exciting and sensing coils are directly wound on the stator poles 215 instead of being provided as separate bobbins 220. In this case, the magnetic flux enhancer is positioned so as to terminate each exciting and/or sensing winding at the side 240 of the pole 215 facing the rotor.

The bobbin 220 serves as a magnetic field generating means, or exciting coil, for generating a distribution of magnetic flux that extends over the gap and actuates on the rotor. In addition or alternatively, the bobbin 220 may serve as a magnetic field detecting means, or sensitive coil, for detecting a change in the magnetic flux distribution caused by a rotation of the rotor.

When the rotor rotates with the prime mover, the bobbins 220 are excited due to the generation of an electromotive force by the rotor rotation. The rotor and stator are constructed in such a way that the modulation of the electromotive force caused by the relative rotational movement of the rotor is resolved to get the output voltages corresponding to respective sine and cosine of the rotor's angular position. The generated signals can be plotted to obtain the angular position of the prime mover shaft.

The technique of the present invention lies in compensating the residual flux produced by the bobbin 220 or exciting coils so as to concentrate the magnetic forces that are set up on the rotor.

Figure 3:
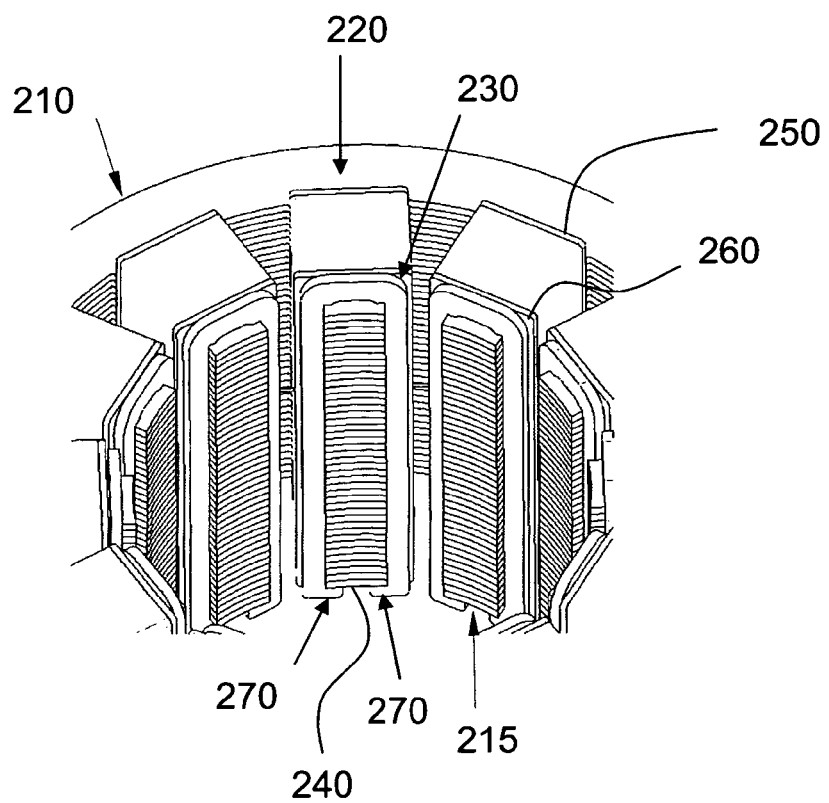
FIG. 3 illustrates schematically a detail of a stator mounted with the magnetic flux enhance system according to the present invention.

A detail of the stator mounted with a bobbin 220 and a magnetic clip 230 according to the present invention on each pole 215 is represented schematically on FIG. 3.

Each bobbin 220 is wound on a specific support 250 that is shaped so as to fit to the stator pole 215, thereby aligning the longitudinal axis of the bobbin 220 along the radial direction of the stator, that is, along a direction substantially normal to the rotation axis Z of the rotor.

The use of bobbins 220, instead of directly winding the coils on the stator poles 215, helps to contain the windings in a constricted region, independently of the number of winding turns, which facilitates the positioning of the magnetic clip 230 at each pole face 240.

The magnetic clip 230 is positioned at the pole face 240, that is, on the side of the bobbin 220 that faces the rotor 120 (not shown) so as to concentrate the generated distribution of magnetic flux over the gap along the radial direction. In particular, the magnetic clip 230 is dimensioned so as to substantially cover the edge 260 of the bobbin 220 facing the rotor, and to run at least partially along the perimeter of the bobbin edge 260 so as to provide a magnetic ring capable of increasing the density of magnetic flux in the radial direction of the pole 215 by concentrating the magnetic flux lines emanating from the bobbin 220.

Preferably, the magnetic clip 230 is designed with a curved, looped shape that substantially follows the external diameter of the pole face 240 and dimensioned so as to snatch into the pole face 240, or the end part of the pole 215 facing the rotor, and to prevent a radial displacement of the bobbin 220. The magnetic clip 230 then also serves as a fastening means for keeping the bobbin 220 into place. The magnetic clip 230 is preferably shaped with open ends 270 so as to increase its flexibility and facilitate its insertion into place at the pole face 240 as well as to allow that the magnetic clip 230 be easily removed if necessary. A certain distance between the magnetic clip 230 and the end of the pole 215 or pole face 240 may be left for increasing the stability of the assembly.

The magnetic clip 230 may be made of alnico (alnico is an alloy containing Aluminium (Al), Nickel (Ni), Cobalt (Co)) or any equivalent magnetic material. The thickness of the magnetic clip 230 is selected based on the selected magnetic material, the desired degree of flux enhancement and the specific configuration of the angle sensor.

The magnetic clip 230 acts as a magnetic flux enhancer by collating all the divergent magnetic fluxes on each pole face 240, and also by summating all the flux lines that emanates and passes through each of the stator poles 215. Hence, the loss of divergent magnetic flux can be avoided and the magnitude of the effective magnetic force actuating on the rotor can be enhanced.

The magnetic clip 230 also helps to absorb any stray fields which are caused by the eddy currents due to self induction, thereby avoiding the residual noise and losses at the pole faces. In a way, it effectively narrows down all the fluxes produced by collating them together and makes it clean and free of any stray magnetic fields.

In the illustrated embodiment, a separate bobbin 220 is fitted into each pole 215 of the stator. However, other configurations may be envisaged in which only one or a group of available poles 215 are provided with a bobbin.

In addition, the bobbin 220 may conveniently comprise both an exciting coil for generating the magnetic field, and a sensing coil for the signal recovery, which are mutually coupled on the same bobbin 220.

The electrically connections between bobbins 220 follows a pre-determined winding scheme.

Figure 4:
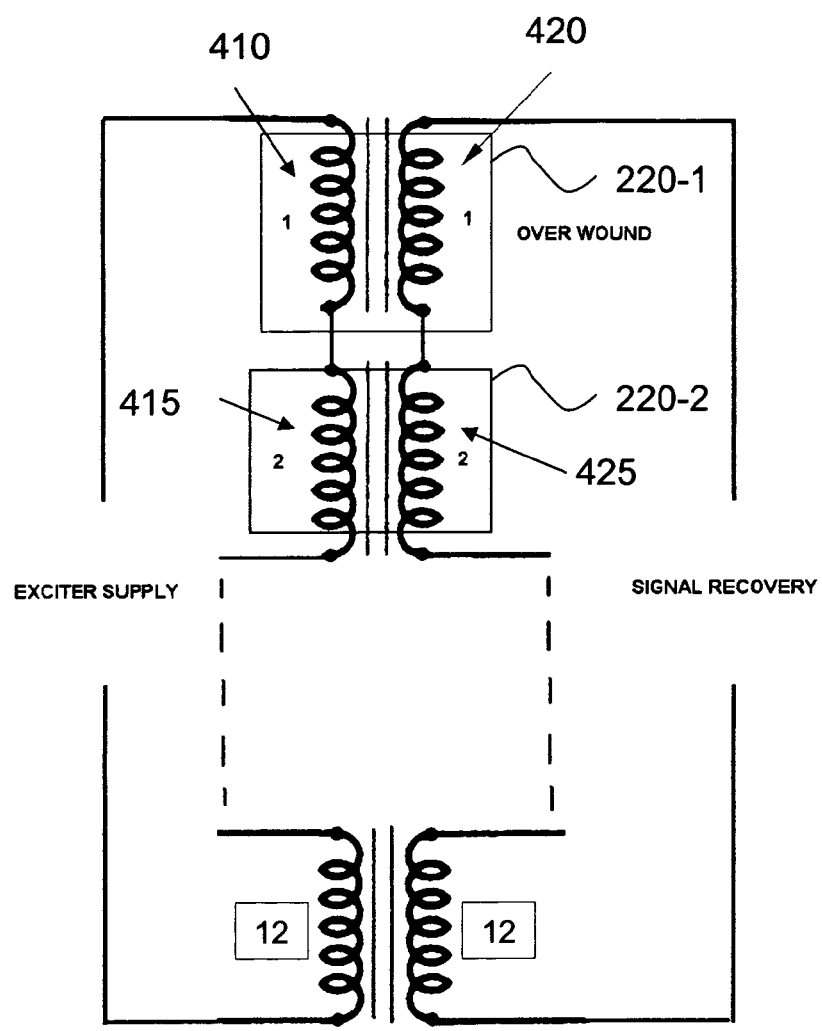
FIG. 4 illustrates schematically a winding scheme of the electromagnetic angle sensor according to the present invention.

FIG. 4 illustrates a scheme for electrically connecting the windings of the bobbins 220 along the loop of the stator.

According to the illustrated connecting scheme, the exciting winding 410 of a bobbin 220-1 at pole 1 is connected in series with the exciting winding 415 of an adjacent bobbin 220-2 at pole 2 such that the end of the exciting winding 410 connects with the start of the exciting winding 415 at the neighboring pole and so on, thereby completing the loop of N poles around the stator by itself (12 poles in the illustrated example). Similarly, the sensing winding 420 of bobbin 220-1 is wired in series with the adjacent sensing coil 425 of bobbin 220-2 at pole 2, which is itself connected in series with the other sensing coils around the stator.

A different winding scheme may be envisaged depending on the need and the specific application for the angle sensor. For instance, the exciting coil and the sensing coil may be provided on separate bobbins so as to be arranged on different poles 215 of the stator depending on the specific sensor design. Further, the number of exciting coils and/or sensing coils may be different. In particular, configurations may be envisaged in that not each pole 215 of the stator is provided with a bobbin 220 having an exciting coil and/or a sensitive coil.

The magnetic flux enhancer system of the present invention may be conveniently applied to other configurations of reluctance type resolvers that are based on the same working principles described above and having other configurations of stators and/or rotors.

The electrical connection between the windings of the separate bobbins 220 may be done using an electrical connecting disc with holes for passing the end wires of each bobbin 220 and with a specific design of electrical connecting paths between the holes for mutually connecting adjacent bobbins according to a specific connection scheme and/or with the power supply and measuring devices. This connection technique is well known in the art and shall not be described here in detail.

Figure 5:
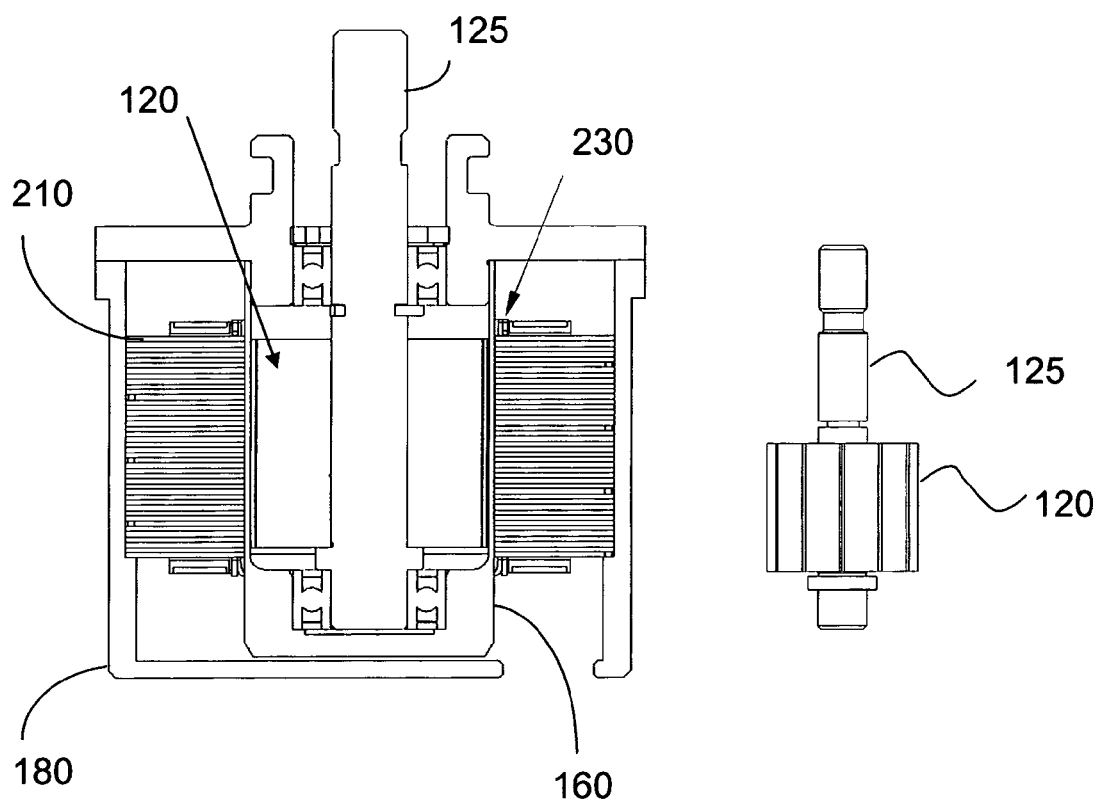
FIG. 5 illustrates schematically a cross-sectional view (image on the left) of the fully assembled electromagnetic angle sensor shown in FIG. 2 and along the rotation axis Z of the rotor; a front view of the serrated rotor is shown by the image on the right.
Figure 6:
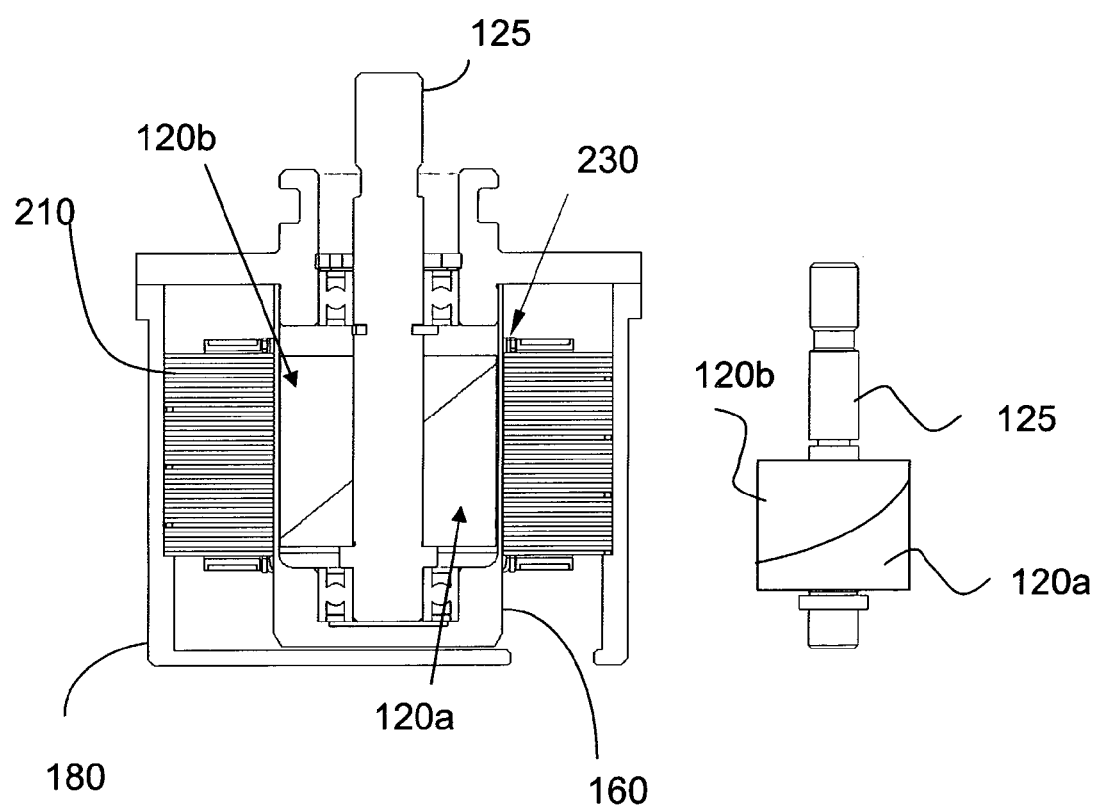
FIG. 6 illustrates schematically a cross-sectional view (image on the left) along a rotation axis of an electromagnetic angle sensor having a magnetic flux enhancer system according to the present invention and a half-magnetic rotor; a front view of the half-magnetic rotor is shown by the image on the right.

The present invention may be conveniently used for an electromagnetic angle sensor with a rotor variant in which the rotor body has a non-regular shape of the external surface facing the stator, such as the single hub 120 with serrations on the surface facing the stator described above, as well as in a rotor variant with a half-magnetic rotor having a magnetic half 120a and a balancing half—120b, as represented schematically in FIGS. 5 and 6, respectively. The magnetic flux enhancer system of the present invention may nevertheless be conveniently used for rotor variants and/or stator shapes other than those illustrated here.

Simulation studies of the magnetic force that actuates on the rotor using Alnico 8 and PERMENORM® (Registered U.S. Trademark of Vacuumschmelze Gmbh Corporation, Gruner Weg 37, Hanau Germany) as magnetic materials for the magnetic clip 230 were performed. The materials of the other constituent parts of the electromagnetic angle sensor used for the simulation study were PERMENORM® 5000 H2 for the stator lamination and the rotor, and stainless steel for the shaft, flange, outer cover, and inner cover. Similar results were obtained for the half-magnetic rotor variant, the material chosen for the balancing half being also stainless steel. The tool used for this simulation study was Design Discovery version 14.

Table 1 shows the simulation results obtained for an assumed magnetic field of 1000 Ampere-turn at Gauge 25 (AWG) and using Alnico 8 as the magnetic material for the magnetic clip 230.

The magnetic force per pole, the total magnetic force and the gain, which is defined by the number of windings of the excitation coil and the excitation current, were simulated for different relative positions of the rotor and the magnetic clip, as well as for the case when no magnetic clip is used.

The term parallel for relative position indicates the pole south of the magnetic field and the term perpendicular indicates the pole north of the magnetic field.

The negative values of the magnetic force in Tables 1 and 2 do not have any quantitative influence, they just indicate the alignment of the magnetic flux vectors in a direction opposite to the direction in the case where there is no magnetic flux enhancer clip in place.

TABLE 1

Simulation results of magnetic force acting on the rotor for a magnetic clip made of Alnico 8

| Rotor Relative position with the pole | Magnetic Clip Relative Position with the pole | Force/pole (lbs) | Total Force (lbs) | Gain (lbs) |
|---|---|---|---|---|
| Parallel | Parallel | −1.488 | −17.856 | −4.716 |
| Parallel | Perpendicular | −1.482 | −17.784 | −4.644 |
| Parallel | No clip | 1.095 | 13.14 | |
| Perpendicular | Parallel | −1.488 | −17.856 | −4.716 |
| Perpendicular | Perpendicular | −1.482 | −17.784 | −4.644 |
| Perpendicular | No clip | 1.095 | 13.14 | |

Table 2 shows simulation results obtained using PERMENORM® 5000 H2 as the magnetic material for the magnetic clip and the same materials for the other constituent parts of the electromagnetic angle sensor as for the simulation results of Table 1. As can be seen from Table 2, the results obtained for the magnetic force per pole, the total magnetic force and the gain are comparable to those obtained using a magnetic clip of Alnico 8.

TABLE 2

Simulation results of magnetic force acting on the rotor for a magnetic clip made of Permenorm 5000 H2

| Rotor Relative position with the pole | Magnetic Clip Relative Position with the pole | Force/pole (lbs) | Total Force (lbs) | Gain (lbs) |
|---|---|---|---|---|
| Parallel | Parallel | −1.444 | −17.328 | −4.188 |
| Parallel | Perpendicular | −1.444 | −17.328 | −4.188 |
| Parallel | No clip | 1.095 | 13.14 | |
| Perpendicular | Parallel | −1.444 | −17.328 | −4.188 |
| Perpendicular | Perpendicular | −1.444 | −17.328 | −4.188 |
| Perpendicular | No clip | 1.095 | 13.14 | |

Thus, the selection of the magnetic material for the magnetic clip 230 depends on the specific application. PERMENORM® offers more flexibility than the Alnico variant magnet in terms of ductility, machinability and manufacturability as a part, besides rigidity. Thus, PERMENORM® is a preferred material for applications where flexibility plays an important role. As the magnetic clip is to be inserted on the stator poles, the ease of assembling is possible with PERMENORM®. Further, this also allows that the magnetic clip be easily removed if necessary.

The manufacture of the Alnico variant magnetic clip with the dimensions required for typical stator poles applications is more expensive in comparison to PERMENORM® since in this case the magnetic clip needs to be processed through complex casting/sintering/bonding methods. This leads to manufacturing concerns relating to its handling techniques (due to high rigidity and brittleness). However, a comparison of the B-H loop (magnetic hysteresis loop) and magnetic property evaluation has shown that Alnico is an ideal material for some applications.

For instance, the Alnico variant magnetic clip might be advantageous for high precision applications where there is less temperature variation influence on the angle sensor.

The comparison of the results of magnitude of the magnetic flux acting on the rotor and the gain obtained with the magnetic flux enhancer system as illustrated in Tables 1 and 2, shows that the use of the magnetic clip as a flux enhancer results in a considerable gain in the effective force acting on the rotor. Further, since the gain is proportional to the number of poles on the stator coil, a reduction of losses of magnetic flux at each poles amounts to a considerable gain in the magnitude of flux overall. The contribution of the coalition of the sparse magnetic vectors to the gain of magnetic force is clearly seen with the enhancement of the forces on the rotor, there by leading to lower current consumption and reduced Ampere turns for the same output as in prior art technology. The accuracy will be increased with continuous and smooth N-S magnetic field at the stator-rotor gap along with homogeneous concentric flux around the rotor area.

Figure 7:
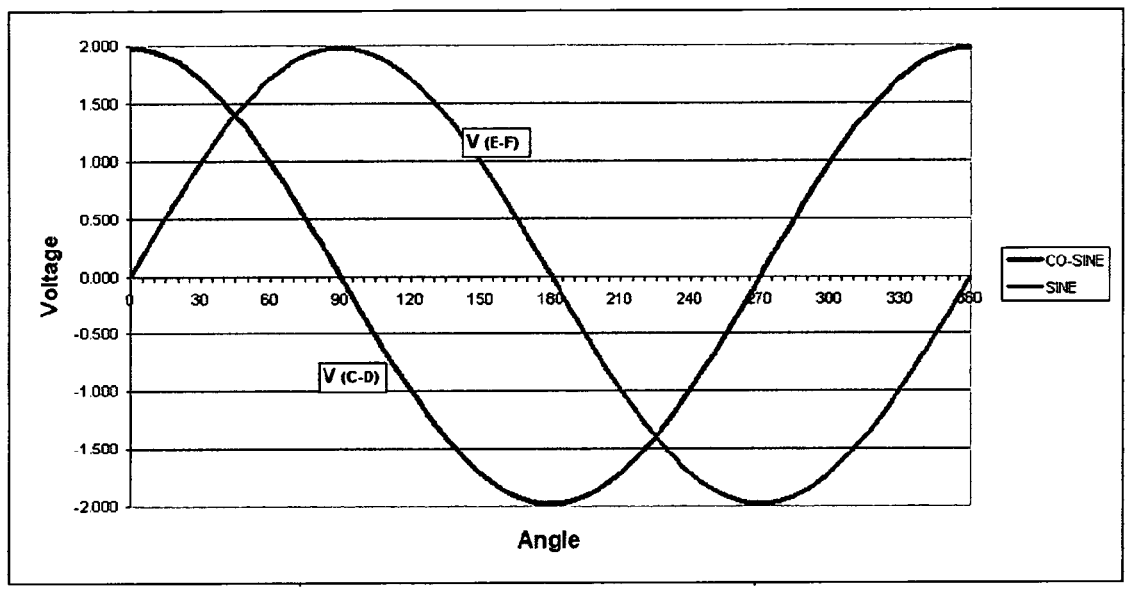
FIG. 7 shows a graph of the variation of the induced voltage at the sensing coils as a function of the rotational angle for an ideal electromagnetic angle sensor having no loss of magnetic force due to divergence of the magnetic field lines at the stator poles.

The number of wires and the winding scheme plays an important role in achieving the precise angular position measurements in reluctance type synchros and resolvers. In an ideal reluctance type resolver where there is no loss of magnetic force due to divergent fields or induced eddy current at the stator poles, the variation of the induced voltage at the sensing coils as a function of the electrical angle follows a perfect sinusoid as illustrated in FIG. 7.

In the ideal case, the sine component V (E–F) and the cosine component V (C–D) of the signal induced at the sensing coil depend on the input voltage V (A–B), the transformation ratio TR and the angle of measurement $\phi$ according to the following equations:

$$V(E-F) = V(A-B) \times TR \times \sin \phi \quad (1)$$

$$V(C-D) = V(A-B) \times TR \times \cos \phi \quad (2)$$

However, in real resolvers and synchros, the rounding off of the wire numbers on each stator pole may lead to errors in the angular measurements. These rounding-off errors amount to the loss of peaks in the wave form induced at the sensing coils, or to a shifting of the measured curve to a non-precise zone of the sine and cosine wave forms.

Figure 8:
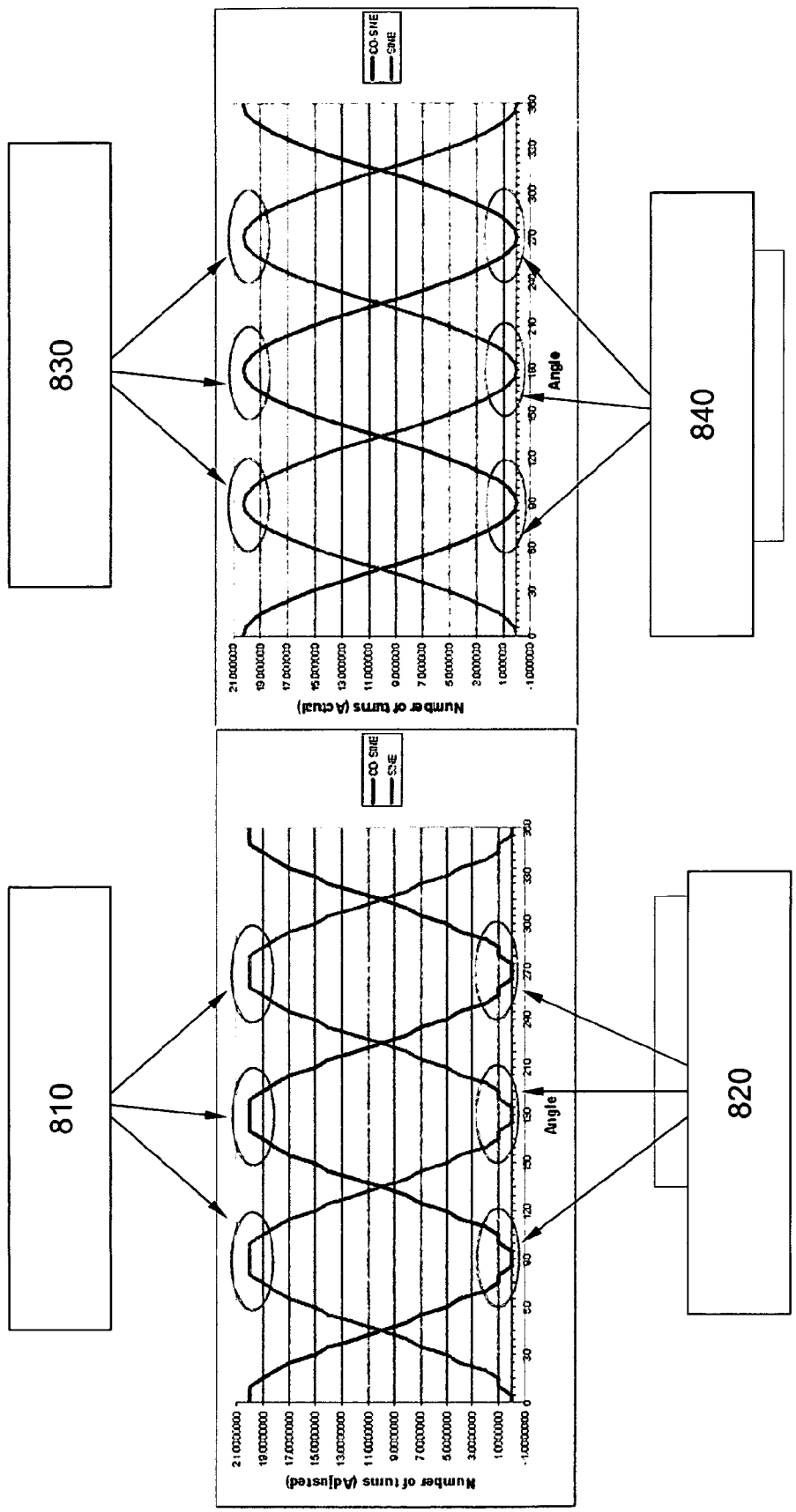
FIG. 8 shows a comparison of the angular error due to rounding off of the number of turns on the poles (number of turns v/s rotational angle in degrees) achieved for a real electromagnetic angle sensor without a magnetic flux enhancer (left-hand graph) and with the magnetic flux enhancer of the present invention, which helps in compensating this round off error (right-hand graph).

The magnetic flux enhancer technique of the present invention allows preventing or minimizing the occurrence of such errors as illustrated in FIG. 8, which shows a comparison of the angular error (Number of turns v/s angular position) for a real electromagnetic angle sensor without the magnetic flux enhancer (left-hand graph) and with the magnetic flux enhancer (right-hand graph).

As can be seen from the graph on the left side of FIG. 8, the maximum 810 and minimum 820 peaks of the sine and cosine components are cut-off within a range of 10 degrees around the angles at which the maximum and the minimum values of each sine and cosine component should occur, which makes impossible to resolve two angle measurements falling in this range.

In contrast, the graph on the right-hand side of FIG. 8 shows that the use of the magnetic flux enhancer allows correcting this angular error contribution. Namely, the sine and cosine components are no longer cut-off at their maximum 830 and minimum 840 peak values. Thus, the precision of the angular measurement at these angle values can be significantly increased.

In summary, in an optimized coil design, consisting of an electromagnetic lamination with N number of poles, and windings (or bobbins) on the poles which generate the electromotive force required in the stator coil to plot the angular measurement, a magnetic force will be acting on the rotor shaft during excitation. By using a clip of a magnetic material dimensioned to the size of the bobbins, and which is suitably positioned on each pole face, it is possible to summate the divergent magnetic flux generated by each bobbin, resulting in a gain of field strength and an enhancement of the magnetic force acting on the rotor.

The use of the magnetic clip on the magnetic pole of the stator allows gathering a substantial part of the divergent magnetic flux lines, collate them and concentrate them for a unified energy focused on the rotor gap. This gives a higher turn up force for a given Ampere turns of the exciting winding. The magnetic flux enhancer system of the present invention then presents several advantages over the prior art. For indicating only a few:

- Reduced ampere turns in the coil, resulting in less bulkier coil, less amount of copper & low resistance, yielding low cost;
- Optimized insulation for the coil, due to reduced stresses/temperature rise on the coil, resulting in higher performance of the device;
- Lower current consumption by the stator winding due to the gain or amplification achieved;
- Optimized core gap and magnetic flux generation;
- Ensures a continuous and smooth N-S magnetic field in the gap between rotor and stator, resulting in higher accuracy of the angular measurement; and
- Summation of all the flux lines that emanates and passes through each of the poles of the stator coil.

The summation of magnetic flux lines results in a homogenization of the magnetic fields, which results in a concentrated magnetic flux around the rotor area, and an increase of the gain of the field strength (due to coalition of the sparse magnetic vectors). It also results in absorption of stray fields, which are caused by eddy currents, thereby avoiding the residual noise and losses at the pole faces. This reduces the vibrations that are setup on the bearings of the device.

The magnetic flux enhancer system for synchros and similar class of sensors as described above with the stated advantages may be conveniently implemented or adapted to other applications in which the loss of magnetic flux are important such as actuators, relays and similar electromagnetic applications, namely, in sensors for aerospace applications.

REFERENCE NUMERAL LIST 100 prior art synchro-resolver
110 flange
115 rotor
120 rotor body, serrated hub
120a magnetic-half of rotor body
120b balancing half of rotor body
125 rotor shaft
130 spacer ring
135 circlip
140 bearing
150 E-clip
160 inner cover
170 stator lamination
175 magnetic poles
180 outer cover
Z rotor axis
200 electromagnetic angle sensor
210 stator lamination
215 stator pole
220 bobbin (220-1, 220-2)
230 magnetic clip
240 pole face
250 bobbin support
260 edge of bobbin on side facing the rotor
270 open ends of magnetic clip
410, 420 exciting windings
415, 425 sensing windings
810, 820 cut-off error in the maximum and minimum peaks
830, 840 correction of the cut-off error

The invention claimed is:

1. An electromagnetic angle sensor having a stator and a rotor, the rotor being rotatably supported along a rotation axis (Z) on the stator and separated therefrom by a gap, the stator having at least one magnetic field generating means adapted to generate a distribution of magnetic flux that extends over the gap, and at least one magnetic field detecting means to detect a change in the magnetic flux distribution caused by a rotation of the rotor, the electromagnetic angle sensor comprising:

a magnetic flux enhancer adapted to be positioned on a side of the at least one magnetic field generating means that faces the rotor and to concentrate the generated distribution of magnetic flux over the gap along a radial direction substantially perpendicular to the rotation axis (Z) wherein the stator comprises at least one pole along the radial direction for arranging said at least one magnetic field generating means and said magnetic flux enhancer, and wherein said magnetic flux enhancer is a magnetic clip adapted to be positioned on a side of the magnetic field generating means that faces the rotor so as concentrate the distribution of generated magnetic flux over the gap along the radial direction.

2. An electromagnetic angle sensor according to claim 1, wherein the stator comprises at least one pole along the radial direction for arranging said at least one magnetic field generating means and said magnetic flux enhancer.

3. An electromagnetic angle sensor according to claim 1, wherein the magnetic flux enhancer is dimensioned so as to substantially cover an edge of the magnetic field generating means that faces the rotor.

4. An electromagnetic angle sensor according to claim 1, wherein
said at least one magnetic field generating means is provided on a separate bobbin adapted to be fitted on said pole, and
said magnetic flux enhancer is adapted to avoid a radial displacement of the bobbin.

5. An electromagnetic angle sensor according to claim 4, wherein both the at least one magnetic field generating means and the at least one magnetic field detecting means are provided on the same bobbin according to a predetermined winding scheme.

6. An electromagnetic angle sensor according to claim 1, wherein the magnetic flux enhancer has open ends adapted to allow the magnetic flux enhancer to be removably snatched into said pole.

7. An electromagnetic angle sensor according to claim 1, wherein the magnetic flux enhancer is made of a magnetic material.

8. An electromagnetic angle sensor according to claim 7, wherein the magnetic material is one of alnico and PERMENORM®.

9. An electromagnetic angle sensor according to claim 1, wherein the rotor is either a serrated rotor made from a ferromagnetic material or a half-magnetic rotor.

10. An electromagnetic angle sensor according to claim 1, wherein:
the at least one magnetic field generating means and the at least one magnetic field detecting means are provided on the same pole, and
the magnetic flux enhancer is positioned between the rotor and said magnetic field generating means and said magnetic field detecting means.

11. An electromagnetic angle sensor having a stator and a rotor, the rotor being rotatably supported along a rotation axis (Z) on the stator and separated therefrom by a gap, the stator having at least one magnetic field generating means adapted to generate a distribution of magnetic flux that extends over the gap, and at least one magnetic field detecting means adapted to detect a change in the magnetic flux distribution caused by a rotation of the rotor, the electromagnetic angle sensor comprising:
a magnetic flux enhancer adapted to be positioned on a side of the at least one magnetic field generating means that faces the rotor and to concentrate the generated distribution of magnetic flux over the gap along a radial direction substantially perpendicular to the rotation axis (Z) wherein the stator comprises a second pole along the radial direction for arranging said at least one magnetic field detecting means; and
further comprising a second magnetic flux enhancer arranged on the second pole and positioned between the magnetic field detecting means and the rotor.

12. An electromagnetic angle sensor comprising a stator and a rotor, the rotor being rotatably supported along a rotation axis (Z) on the stator and separated therefrom by a gap, the stator having at least one magnetic field generating means adapted to generate a distribution of magnetic flux that extends over the gap, and at least one magnetic field detecting means adapted to detect a change in the magnetic flux distribution caused by a rotation of the rotor, the electromagnetic angle sensor comprising:
a magnetic flux enhancer adapted to be positioned on a side of the at least one magnetic field generating means that faces the rotor and to concentrate the generated distribution of magnetic flux over the gap along a radial direction substantially perpendicular to the rotation axis (Z); and a plurality of magnetic field generating means and a plurality of magnetic flux enhancers, each magnetic flux enhancer being positioned on the side of the respective magnetic field generating means that faces the rotor and being adapted to concentrate the distribution of magnetic flux generated by the respective magnetic field generating means along the radial direction.

13. A magnetic flux enhancer system for reluctance sensors having a stator and a rotor that is rotatably supported along a rotation axis (Z) on the stator and separated therefrom by a gap, the stator generating a distribution of magnetic flux that extends over the gap and detecting a change in the generated magnetic flux caused by a rotation of the rotor, the magnetic flux enhancer system comprising:
a magnetic flux enhancer adapted to be positioned on a side of a magnetic field generating means of the stator that faces the rotor and to concentrate the distribution of generated magnetic flux over the gap along a radial direction substantially perpendicular to the rotation axis (Z) wherein said magnetic field generating means is provided on a separate bobbin arranged on a pole that projects in a radial direction towards the rotor, and the magnetic flux enhancer being a magnetic clip adapted to be snapped into said pole and to avoid a radial displacement of the bobbin.

14. An electromagnetic angle sensor having a stator and a rotor, the rotor being rotatably supported by a rotation axis (Z) on the stator and separated therefrom by a gap, the stator having at least one magnetic field generating means adapted to generate a distribution of magnetic flux that extends over the gap, and at least one magnetic field detecting means adapted to detect a change in the magnetic flux distribution caused by a rotation of the rotor, the electromagnetic angle sensor comprising:
a magnetic flux enhancer adapted to be positioned on a side of the at least one magnetic field generating means that faces the rotor and to concentrate the generated distribution of magnetic flux over the gap along a radial direction substantially perpendicular to the rotation axis (Z) wherein the stator comprises at least one pole along the radial direction for arranging said at least one magnetic field generating means and said magnetic flux enhancer, and wherein the magnetic flux enhancer has open ends adapted to allow the magnetic flux enhancer to be removably snatched into said pole.

15. An electromagnetic angle sensor according to claim 14, wherein the magnetic flux enhancer is dimensioned so as to substantially cover an edge of the magnetic field generating means that faces the rotor.

16. An electromagnetic angle sensor according to claim 14, wherein said at least one magnetic field generating means is provided on a separate bobbin adapted to be fitted on said pole, and said magnetic flux enhancer is adapted to avoid a radial displacement of the bobbin.

17. An electromagnetic angle sensor according to claim 14, wherein both the at least one magnetic field generating means and the at least one magnetic field detecting means are provided on the same bobbin according to a predetermined winding scheme.

18. An electromagnetic angle sensor according to claim 14, wherein the magnetic flux enhancer has open ends adapted to allow the magnetic flux enhancer to be removably snatched into said pole.

19. An electromagnetic angle sensor according to claim 14, wherein the magnetic flux enhancer is made of a magnetic material.

20. An electromagnetic angle sensor according to claim 19, wherein the magnetic material is one of alnico and PERMENORM®.

21. An electromagnetic angle sensor according to claim 14, wherein the rotor is either a serrated rotor made from a ferromagnetic material or a half-magnetic rotor.

22. An electromagnetic angle sensor according to claim 14, wherein:

the at least one magnetic field generating means and the at least one magnetic field detecting means are provided on the same pole, and the magnetic flux enhancer is positioned between the rotor and said magnetic field generating means and said magnetic field detecting means.

* * * * *